United States Patent

[11] 3,602,843

| [72] | Inventor | Jakob De Vries<br>Allenwinden, Zug, Switzerland |
|---|---|---|
| [21] | Appl. No. | 759,631 |
| [22] | Filed | Sept. 13, 1968 |
| [45] | Patented | Aug. 31, 1971 |
| [73] | Assignee | Landis & Gyr AG<br>Zug, Switzerland |
| [32] | Priority | Sept. 14, 1967 |
| [33] | | Switzerland |
| [31] | | 12973/67 |

[54] ELECTRONIC MULTIPLICATION DEVICE AND ELECTRICAL ENERGY MEASURING SYSTEM USING SAME
19 Claims, 5 Drawing Figs.

[52] U.S. Cl. .................................................. 332/9,
235/194, 307/261, 328/20, 328/27, 331/113, 332/41

[51] Int. Cl. ........................................... H03k 7/02
[50] Field of Search .............................. 332/1, 9, 9
T, 14, 31, 31 T, 41; 235/194; 331/113; 307/261,
328/13, 20, 27

[56] References Cited
UNITED STATES PATENTS

| 2,968,010 | 1/1961 | Case ............................ | 332/41 |
| 2,987,683 | 6/1961 | Powers ....................... | 332/41 X |
| 2,990,516 | 6/1961 | Johannessen ................. | 307/261 X |
| 3,371,289 | 2/1968 | Luna et al. .................. | 331/113 X |

Primary Examiner—Alfred L. Brody
Attorney—Morgan, Finnegan, Durham & Pine

ABSTRACT: A mark-space amplitude-modulation-type electronic multiplier wherein an astable multivibrator with two separate current sources controlled according to a first input signal provide a mark-space modulated signal, and a pair of field effect transistor switches for a circuit for amplitude modulating the mark-space-modulated signal according to a second input signal.

INVENTOR.
JAKOB DE VRIES

ELECTRONIC MULTIPLICATION DEVICE AND ELECTRICAL ENERGY MEASURING SYSTEM USING SAME

This invention relates to an electronic multiplier which may, for example, be used for electric power measurement in an electricity meter.

It is known that the electric power P of an alternating current can be calculated from the following formula:

$$N = IE \cos Q/2$$

where: $I$ is the peak current, $E$ is the peak voltage and $Q$ is the phase displacement.

However this formula only applies to single frequencies, and hence, when taking into account possible harmonics, the transient power $IE$ must be found, $E$ being the transient voltage and $I$ the transient current. The transient power can be negative at times, and as the power is obtained by integration with respect to time of the transient powers the negative power components must be subtracted. The multiplier used must therefore provide the correct sign.

Multiplication arrangements are known which only give the magnitude of the power so that the sign of current and voltage must be found by means of additional threshold switches, and then the sign of the product must be determined with a logic circuit. These arrangements are accordingly expensive.

It is also known that the requirements with regard to precision in an electric meter in the small-load range are considerably higher than for example in the case of measuring instruments of the 1 percent class where the error is referenced to the full scale value. In the case of the electric meter the relative error, referenced to the transient desired value, must be less than 1–2 percent for small currents up to approximately 5 percent full current. As a result, the degree of precision in the electric meter must be approximately 20 times greater than with a 1 percent class instrument, and this performance should remain constant for about 20 years.

It is difficult to meet such rigorous precision requirements with known electronic multipliers. In particular the known arrangements have the disadvantage that by using for multiplication semiconductor devices with characteristic curves which are both temperature dependent and vary with time, the desired requirements with regard to precision are not met. This applies, for example when using Hall generators; when forming the product $xy$ in accordance with the equation $$\log xy = \log x + \log y,$$

where logarithmic characteristic curves of semiconductor devices are used and also when determining the product $xy$ from the equation $$4xy = (x+y)^2 - (x-y)^2,$$

where quadratic characteristic curves of semiconductor devices are necessary.

According to the present invention there is provided an electronic multiplier of the mark-space-modulation type incorporating a multivibrator for mark-space modulation in combination with an amplitude modulator. The multivibrator is in the form of an emitter-coupled astable transistor multivibrator with which are associated two separate current sources which each comprise a transistor of which the collector is connected to the emitter of the respective transistor of the multivibrator and the emitter is connected by way of resistance to a supply voltage, wherein the bases of the two transistors of the current sources are connected to the two ends of the secondary winding of a voltage transformer and a center tap of this secondary winding is connected to a constant-reference voltage source. The amplitude modulator comprises two electric switches in the secondary circuit of a current transformer and having proportional voltage-current characteristics.

An advantageous development of the invention further provides that the reference voltage source is not connected directly to the center tap of the secondary winding of the voltage transformer, but instead that an emitter-follower is connected in an intermediate position so that its base-emitter voltage compensates for temperature influences upon the base-emitter voltages of the transistors of the two current sources.

The use of mark-space-amplitude modulation for multiplying two values, for example the current and voltage of an electric supply, is already known. In the known arrangements however, the mark-space modulator essentially comprises a symmetrical emitter-coupled astable multivibrator, the emitter currents of which are produced by means of a differential amplifier, while a return coupling is used for linearization, which means increased expenditure compared to the arrangement according to the invention. Generation of the emitter currents by transistors connected as current sources, as proposed in the present invention, has the advantage that nonlinearity can more easily be compensated.

A known circuit of an amplitude modulator connected downstream of the mark-space modulator is with advantage modified in that the electronic switches are formed by two field-effect transistors, which have a considerable effect with regard to the precision of measurement of the product, particularly of voltage and current values where small currents are involved. The advantages of this novel type of circuit lie in the fact that field-effect transistors conduct equally well in either direction and have, in the conducting condition, a purely ohmic residual resistance, that is a proportional voltage-current characteristic. In accordance with a preferred embodiment of the invention, a complementary pair of these field-effect transistors is used since their gate voltages are always in phase and, consequently, there is no need for an inverting stage.

Leakage voltages which can occur as the result of imperfect control of switching operations of the field-effect transistor, are, with the transistors correctly matched, symmetrical and completely disappear upon subsequent filtering according to the circuit of the invention.

A further advantage of the invention is that the phase displacements for current and voltage can be brought to equal magnitudes by suitable dimensioning and reciprocal tuning of the current and voltage transformers, so that the resulting phase displacement of the current voltage is zero. The transformers cam be tuned by means of a variable resistor connected in the primary circuit of the voltage transformer, so that the phase displacement of the voltage transformer can be matched to that of the current transformer.

The foregoing and other features of the invention will be more fully described in the following specification which sets forth an illustrative embodiment. The specification includes the drawings, in which:

FIG. 1 shows, in diagrammatic form, a method of determining the product of a voltage and an associated current in such a way that there is formed, at the output of the circuit, a signal which represents the power i.e., the product of the voltage and the current.

Figure 1:
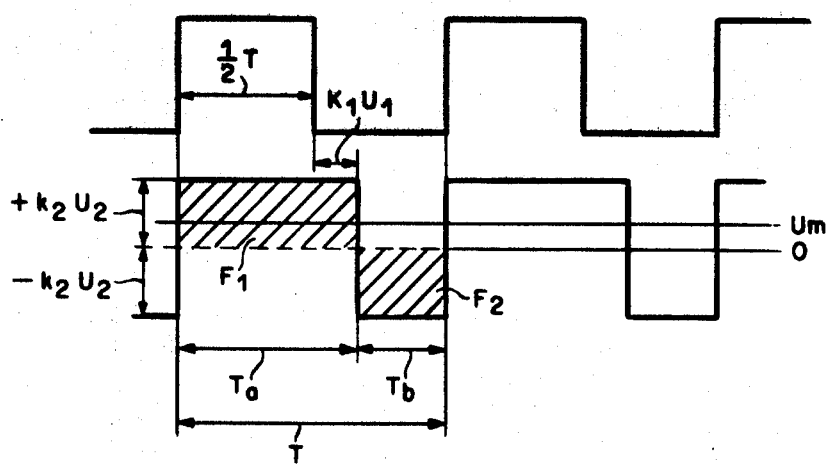
FIG. 1 is an explanatory diagram.

A modulator, to be described hereinafter, produces a symmetrical series of square wave pulses as illustrated in FIG. 1, in which the mark and the space are each equal to one-half the period $T$. If by suitable modulation the mark is changed by an amount $\Delta t = k_1 U_1$, proportional to one measurement value $U_1$ wherein $U_1$ can be, for example, a direct alternating current or voltage, and, correspondingly, the amplitudes of the pulses during this increased mark period $T_a$ are associated with the positive second measurement value $+k_2 U_2$, wherein the value $U_2$ can also be a direct or an alternating current or voltage, and $k_1$ and $k_2$ are proportionality constants; and if the amplitude during the space $T-T_a=T_b$ is also associated with the negative second measurement value $-k_2U_2$, the mean value $U_m$ is equal to the difference of the areas $F_1$ and $F_2$, divided by the period $T$.

Consequently $$U_m = \frac{F_1-F_2}{T} = \frac{k_2U_2}{T}\{(1/2T+k_1U_1) - [T-(1/2T+k_1U_1)]\} = \frac{2k_1U_1 \cdot k_2U_2}{T}$$

As $2k_1k_2$ are $T$ are constants, the mean value $U_m$ is proportional to line current, or vice versa. With alternating current the period $T$ must obviously be low with respect to the cycle duration (20 milliseconds for 50-cycle supply) or the periods of the harmonics which are of importance. According to the embodiment, which is for use with a 50-cycles per second supply line, the period $T$ is from 0.1 millisecond to 1 millisecond corresponding to a modulation pulse frequency from 1 to 10 kilocycles.

Figure 2:
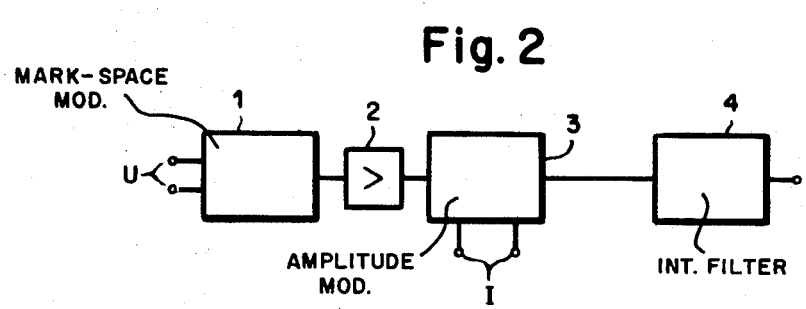
FIG. 2 is a block circuit diagram.

FIG. 2 shows a block circuit diagram of this multiplication method.

To form the product of current and voltage, the voltage $E$ is associated with a mark-space modulator 1 as an individual measurement value and the current $I$ is associated as an individual measurement value to an amplitude modulator 3 connected by way of amplifier 2 to the output of the mark-space modulator 1. A filter 4 is connected to the output of the amplitude modulator 3 and derives the mean value of the output over the period $T$.

The mark-space modulator 1 supplies a pulse voltage of which the "mark-space" ratio, is modulated in accordance with the voltage value $U_1$, wherein there applies, according to FIG. 1: $T_a-T_b/T_a+T_b=2k_1U_1/T$ In the amplitude modulator 3 the "mark-space" modulated series of pulses is modulated in amplitude according to the current $I$ wherein the sign of the amplitude of the mark-space-square-wave-pulse voltage is positive during the marks and is negative during the spaces.

Figure 3:
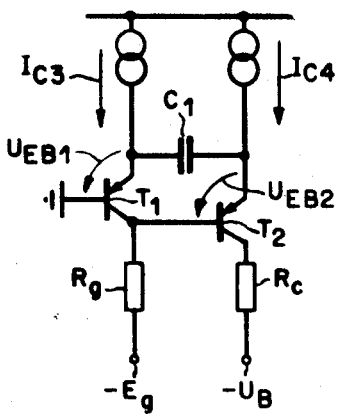
FIG. 3 is a circuit diagram of a known asymmetric emitter-coupled multivibrator which is used in the circuit construction according to the invention.

FIG. 3 shows the circuit diagram of the asymmetric emitter-coupled astable transistor multivibrator used in the mark-space modulator 1. The two transistors are indicated at $T_1$ and $T_2$ and $I_{c4}$ are two currents which flow from corresponding current sources, flowing alternately through one or other of the transistors $T_1$ or $T_2$.

If for example the transistor $T_1$ is conducting and the transistor $T_2$ is nonconducting, the current $I_{c3}$ flows through the transistor $T_1$ and the resistor $R_o$ to the voltage source $-E_o$. The current $I_{c4}$ flows through a capacitor $C_1$ and the transistor $T_1$ and hereby charges the capacitor $C_1$. Due to the charging of the capacitor $C_1$ however the emitter voltage of the transistor $T_2$ varies in that the transistor suddenly becomes conducting and the transistor $T_1$ becomes nonconducting. Consequently the current $I_{c4}$ flows through the transistor $T_2$ and the resistor $R_e$ to the voltage source $-U_B$. At the same time the current $I_{c3}$ flows through the capacitor $C_1$, transistor $T_2$ and the resistor $R_e$ to the negative voltage source $-U_B$, whereby it charges the capacitor $C_1$ in the opposite sense. As soon as the voltage at the emitter of the transistor $T_1$ rises above zero, the transistor $T_1$ quickly becomes conducting and $T_2$ becomes nonconducting equally rapidly, so that the cycle can begin again.

Depending on the values of the resistors, particularly the resistor $R_o$, and of the emitter current and the emitter-base voltages, the charging cycle of the capacitor $C_1$ can be suitably fixed or varied.

Figure 4:
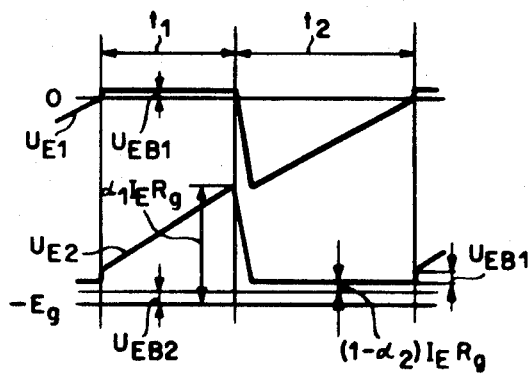
FIG. 4 is a diagram of the operating phases of the multivibrator according to FIG. 3.

FIG. 4 shows a timing diagram of the voltages $U_{E1}$ and $U_{E2}$ at the emitters of the transistors $T_1$ and $T_2$ (FIG. 3) relative to ground during such a charging cycle. The difference of the two voltages $U_{E1}$ and $U_{E2}$ gives the voltage across the capacitor $C_1$. Therein $I_e=I_{c3}+I_{c4}$ and $a_1=I_{c1}/I_{E1}$ ($a_2=I_{c2}/I_{E2}$) is the current amplification of the transistor $T_1(T_2)$ wherein $I_{E1}(I_{E2})$ indicates the corresponding emitter current and $I_{c1}(I_{c2})$ represents the collector current of the transistor $T_1(T_2)$.

If $t_1$ is the time during which the transistor $T_1$ is conducting and $t_2$ the time during which the transistor $T_2$ is conducting, there applies for these times in accordance with FIG. 4:

$$t_1 = \frac{(I_E R_g - 2U_{EB}) \cdot C_1}{I_{C4}}$$

if $$a_1=a_2=1 \text{ and } U_{EB1}=U_{EB2}$$

The corresponding applies for $t_2$:

$$t_2 = \frac{(I_E R_g - 2U_{EB}) \cdot C_1}{I_{C3}}$$

There follows from the last two equations for $t_1$ and $t_2$:

$$\frac{t_2-t_1}{t_1+t_2} = \frac{I_{C4}-I_{C3}}{I_{C3}+I_{C4}}$$

According to the above formulas for the charging times of the capacitor $C_1$ there results as a fundamental frequency $f_a$ for the multivibrator, if the two currents $I_{C3}$ and $I_{C4}$ are equal, which should be the case if they are not yet modulated:

$$f_a = \frac{1}{2t} \approx \frac{I_{C3}}{2I_E R_g C_1} = \frac{1}{4R_g C_1}$$

if $$I_E R_g \gg U_{EB}$$

The emitter-coupled multivibrator can be used as a mark-space modulator if the current $I_{C3}$ is influenced by the voltage $U$ as follows, wherein $U_o$ is a constant reference voltage:

$$I_{C3} = \frac{U_0-U}{R}$$

Let the other current $I_{C4}$ have the form:

$$I_{C4} = \frac{U_0+U}{R}$$

If these two formulas are introduced into the above equation, the result is:

$$\frac{t_2-t_1}{t_1+t_2} = \frac{U}{U_0}$$

The mark-space ratio is therefore, as was assumed for FIG. 1, proportional to $U$.

Figure 5:
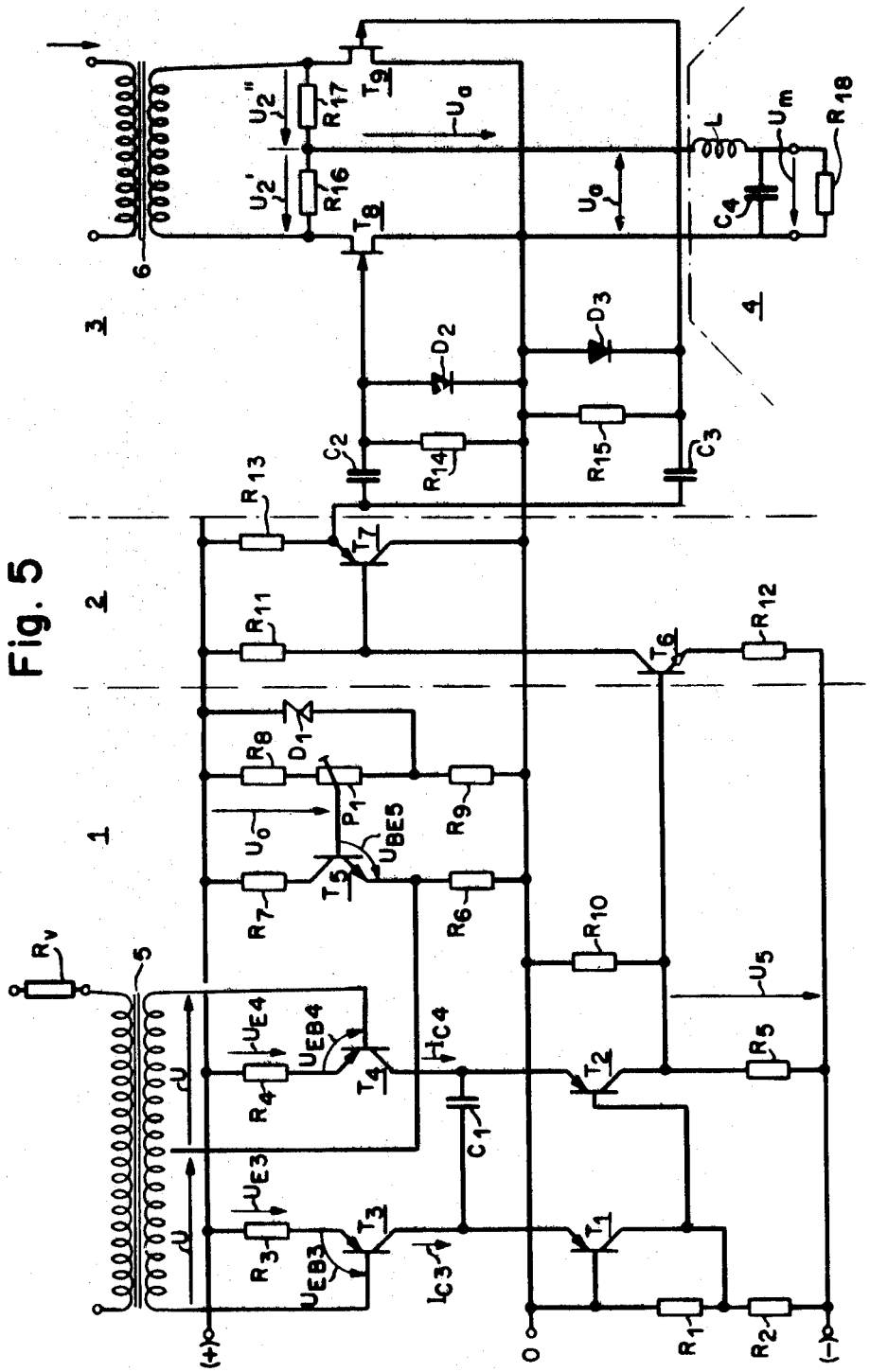
FIG. 5 is a complete schematic circuit diagram of an electronic multiplier according to the invention.

With reference to FIG. 5 there is illustrated the manner in which the relationships:

$$I_{C3} = \frac{U_0-U}{R} \text{ and } I_{C4} = \frac{U_0+U}{R}$$

can be carried into effect in a circuit.

The parts indicated at 1, 2, 3 and 4 of the circuit diagram correspond to those of the block diagram of FIG. 2.

In the circuit there are indicated at $T_1$ and $T_2$ two transistors which, with the capacitor $C_1$, form the astable emitter-coupled multivibrator 1 already described in FIG. 3.

Two ohmic resistors $R_1$ and $R_2$ connected in series between a negative supply and ground potential form a voltage divider to fix the feed voltage $-E_o$ for the multivibrator 1. $T_3$ and $T_4$ are two transistors of which the emitters are connected to a positive supply via resistors $R_3$ and $R_4$ and of which the collectors are connected to the corresponding emitters of the two transistors $T_1$ and $T_2$ of the multivibrator 1. A voltage transformer 5 supplies the voltage $2U$ at a magnitude suited to the circuit. The transformer also serves to isolate the circuit.

$R_r$ is a variable resistor which serves to adjust the phase displacement of the voltage transformer 5 to the phase displacement of the current transformer 6. It is connected in series with the primary winding of the voltage transformer 5.

A reference voltage $U_0$ is fixed by a Zener diode $D_1$ in series with a resistor $R_9$ between the positive supply and ground potential. Parallel to the Zener diode $D_1$ there is connected in series with a fixed resistor $R_8$ a variable finely adjustable potentiometer $P_1$ in order to be able to adjust and correct the reference voltage $U_o$.

The tap of the potentiometer $P_1$ is connected to the base of the transistor $T_5$ of an emitter-follower, the collector of which is connected to the positive supply via a resistor $R_7$ and the emitter of which is connected through a resistor $R_6$ to the ground potential and to the center tap of the secondary winding of the voltage transformer $5$, wherein the base-emitter voltage $U_{BE5}$ of the emitter-follower $T_5$ compensates the emitter-base voltages $U_{EB3}$ or $U_{EB4}$ of the transistors $T_3$ and $T_4$. The following voltage $U_{E3}$ appears across the resistor $R_3$:

$$U_E{}^3 = U_0 + U_{BE5} - U - U_{EB3}$$

As a result of compensation, $U_{EB3} = U_{BE5}$, and therefore $$I_{C3} \approx a_3 \cdot \frac{U_0 - U}{R_2}$$

Wherein the current amplification, $a_3 = I_{C3}/I_{E3}$
The voltage $U_{E4}$ appears across resistor $R_4$:

$$U_{E4} = -U_{EB4} + U + U_{BE5} + U_o$$

As a result of compensation, $U_{EB4} = U_{BE5}$, and therefore $$I_{C4} \approx a_4 \cdot \frac{U_0 + U}{R_4}$$

Wherein the current amplification, $a_4 = I_{C4}/I_{E4}$
With $R_3 = R_4 = R$ and $a_3 = a_4$, the requirements made above on the circuit are met.

As the resistors $R_3$ and $R_4$ influence the precision of the multiplier, it is of advantage for at least these resistors to be in the form of precision resistors which are not sensitive to temperature, for example, in the form of metal foil resistors.

The part 2 represents a current amplifier by means of which the pulse output voltage $U_5$ excited by the mark-space modulator 1 is raised across $R_5$ to a value necessary for the control of the electronic switches $T_8$, $T_9$ (to be described hereinafter) rf the amplitude modulator 3. The input state of the amplifier 2 comprise the transistor $T_6$ with the collector resistor $R_{11}$ and the emitter resistor $R_{12}$. The output of the amplifier 2 is formed by an emitter-follower with the transistor $T_7$ and the emitter resistor $R_{13}$ so that the output impedance is sufficiently low.

The amplitude modulator 3 comprises networks, each with a capacitor $C_2$, a resistor $R_{14}$ and a diode $D_2$ or $C_2$, $R_{15}$, $D_3$, of which the diode $D_2$ or $D_3$ acts as a levelling diode in order to bring the amplified pulse voltage to the correct voltage level with respect to the ground potential. This level adjustment is necessary as the two switches $T_8$ and $T_9$ with proportional voltage-current characteristic, are in the form of complementary field-effect transistors. This level adjustment acts as follows: for the P-channel field-effect transistor $T_9$ the control voltage is either zero or positive: for the N-channel field-effect transistor $T_8$ the control voltage is either zero or negative. The equal resistors $R_{16}$ and $R_{17}$ form the load of current transformer 6; the voltages $U_2'$ or $U_2''$ appearing as a result of the current flowing through these two resistors being the voltages which modulate the amplitude.

Connected between the ends of the secondary winding of the current transformer 6 and earth potential are the field-effect transistors $T_8$ (of N-channel type) which are opened and closed in push-pull by the control voltages of the mark-space modulator 1, so that the current in the load $R_{18}$ flows alternately through $T_8$ and through $T_9$. The output voltage $U_a$ is derived from the junction of the two resistors $R_{16}$ and $R_{17}$. The low-pass filter 4 comprises for example a self-induction L and a capacitance $C_4$ which functions as an integrator and serves to form the voltage mean value $U_m$.

A resistor $R_{18}$ represents a load across which the voltage $U_m$ proportional to the measured electrical power is developed.

Although only one embodiment of the invention has been described in detail, it should be obvious that there are numerous variations within the scope of this invention. The invention is more particularly defined in the appended claims.

1. An electronic multiplier of the mark-space-amplitude-modulation type comprising
   a mark-space modulator including
      a multivibrator including a pair of transistors each including base, emitter and collector control elements, and a time-delay cross-coupling network connected between one control element of each of said transistors and operative to control the conductive states of said transistors in accordance with time-delay characteristics of said cross-coupling network
      a separate current source for each of said transistors of said multivibrator, each of said current sources comprising
         a control transistor for controlling current flow according to the conductive state thereof, and
      circuit means connected to said control transistors to control the conductive states thereof according to a first input signal;
   an amplitude modulator including
      a pair of electronic switches having proportional voltage-current characteristics,
      circuit means connected to control said switches to amplitude modulate an applied signal according to a second input signal;
   circuit means for coupling said mark-space modulator to said amplitude modulator so that the mark-space-modulated signal produced by said mark-space modulator is amplitude modulated by said amplitude modulator.

2. An electronic multiplier according to claim 1 wherein said circuit means in said mark-space modulator comprises a center tapped secondary winding of a voltage transformer, the bases of said control transistors being connected to the ends of said winding and the center tap being coupled to a reference voltage source, and wherein said circuit means in said amplitude modulator comprises the secondary winding of a current transformer with the ends thereof connected to control different ones of said switches.

3. An electronic multiplier according to claim 1 wherein each of said transistors includes an emitter, collector and base, and wherein said transistors of said astable multivibrator are emitter coupled, the collectors of said control transistors are connected to the emitters, respectively, of said transistors of said multivibrator, and the emitters of said control transistors are connected to a supply voltage via resistors.

4. An electronic multiplier of the mark-space-amplitude-modulation type comprising
   a mark-space modulator including
      an emitter-coupled astable multivibrator comprising interconnected transistors,
      two separate current sources each comprising
         a control transistor with its collector connected to the emitter of a respective transistor in said multivibrator, and
         a resistance connected between the emitter of the control transistor and a supply voltage,
      a center-tapped secondary winding of a voltage transformer,
         the ends of said winding being connected to the bases of said control transistors, and
         the center tap of said winding being coupled to a constant reference voltage source;
   an amplitude modulator including
      two electronic switches having proportional voltage-current characteristics, and
      a current transformer, said electronic switches being connected in the secondary circuit of said current transformer; and
   circuit means for coupling said mark-space modulator to said amplitude modulator so that the mark-space-modulated signal produced by said mark-space modulator is amplitude-modulated by said amplitude modulator.

5. A multiplier according to claim 4, wherein said constant reference voltage source includes a temperature-compensated Zener diode connected in series with a resistor between a voltage source and ground to stabilize said reference voltage.

6. A multiplier according to claim 5, wherein a finely adjustable potentiometer is connected in parallel with said Zener diode in order to provide an additional fine adjustment of said reference voltage fixed by said Zener diode and to adjust the measurement constants.

7. A multiplier according to claim 6, wherein the tap of said potentiometer is connected to the base of an emitter-follower transistor of which the collector is connected by way of a resistor to said supply voltage, and the emitter of which is connected by way of a resistor to ground and is also connected to said center tap on said secondary winding of said voltage transformer, whereby the base-emitter voltage of the emitter-follower transistor compensates the emitter-base voltages of the control transistors in said current sources.

8. A multiplier according to claim 4, wherein each of said resistances in said current sources is in the form of a precision resistor which is substantially temperature independent.

9. A multiplier according to claim 4, wherein said multivibrator is unsymmetrical.

10. A multiplier according to claim 4, wherein said secondary circuit of said current transformer includes a secondary winding loaded with two equal resistors connected in series, and wherein there is connected between one end of said secondary winding and ground a first field-effect transistor and between the other end of said secondary winding and ground a second field-effect transistor which is complementary to said first field-effect transistor.

11. A multiplier according to claim 10, wherein said resistors loading said secondary winding of said current transformer are precision resistors which are substantially temperature independent.

12. A multiplier according to claim 4, further comprising a filter connected to the output of said amplitude modulator.

13. A multiplier according to claim 4, further including a variable resistor connected in the primary circuit of said voltage transformer in order to tune together the phase displacements of said two transformers.

14. An arrangement for forming the product of a voltage and a current comprising a multiplier according to claim 4, arranged to supply said voltage across the primary winding of said voltage transformer and means arranged to supply said current across the primary winding of said current transformer.

15. In a circuit for measuring electrical energy as of the product of the parameters of voltage and current, the combination of
a mark-space modulator for providing a first modulated signal having a mark-space ratio in accordance with one of said parameters;
an integrating circuit; and
an amplitude modulator including;
  a transformer coupled to receive the other of said parameters, and
  electronic-switching means connected to said mark-space modulator, said integrating circuit and said transformer for coupling said transformer directly to the input of said integrating circuit with a polarity controlled according to the mark-space ratio of said first modulated signal so that the mean value of the signal supplied to the input of said integrating circuit is proportional to the product of the parameters.

16. A circuit according to claim 15 wherein said integrating circuit comprises a shunt capacitor.

17. A circuit according to claim 15 wherein said selective switching means comprises at least one field-effect transistor.

18. A circuit according to claim 18 wherein said selective switching means comprises a pair of field-effect transistors controlled by said mark-space modulator in push-pull fashion.

19. A circuit according to claim 15 wherein said mark-space modulator comprises a pair of transistors interconnected to form an astable multivibrator.